US010256636B2

(12) United States Patent
Luo

(10) Patent No.: US 10,256,636 B2
(45) Date of Patent: Apr. 9, 2019

(54) SPRAYING HEAT PRESERVATION VAPOR SUPPLYING DEVICE AND GENERATOR APPARATUS USING SUCH DEVICE

(71) Applicants: BIG SUN ENERGY TECHNOLOGY INC., Hsinchu County (TW); Chia Ching Luo, Hsinchu County (TW)

(72) Inventor: Chia Ching Luo, Hsinchu County (TW)

(73) Assignees: BIG SUN ENERGY TECHNOLOGY INC., Hsinchu County (TW); Chia Ching Luo, Hsinchu County (TW)

( * ) Notice: Subject to any disclaimer, the term of this patent is extended or adjusted under 35 U.S.C. 154(b) by 422 days.

(21) Appl. No.: 15/085,576

(22) Filed: Mar. 30, 2016

(65) Prior Publication Data

US 2016/0308364 A1    Oct. 20, 2016

(30) Foreign Application Priority Data

Apr. 16, 2015 (TW) .............................. 104112278 A

(51) Int. Cl.
*H02J 3/38* (2006.01)
*F22B 1/02* (2006.01)
(Continued)

(52) U.S. Cl.
CPC .............. *H02J 3/383* (2013.01); *F01K 3/186* (2013.01); *F22B 1/028* (2013.01); *F22B 1/287* (2013.01);
(Continued)

(58) Field of Classification Search
CPC . F24H 1/28; F24H 7/02; F24H 7/0433; F28D 20/021; Y02E 60/145; F22B 27/04; F01K 3/08
See application file for complete search history.

(56) References Cited

U.S. PATENT DOCUMENTS 2,363,488 A * 11/1944 Bartlett .................... B63C 7/12
114/50
4,244,350 A   1/1981 Chubb
(Continued)

FOREIGN PATENT DOCUMENTS

CH        465810 A      11/1968
CN     201359276 Y      12/2009
(Continued)

OTHER PUBLICATIONS

Extended European Search Report of EP Application No. 16165091.6-1605 dated Oct. 31, 2016, 9 pages.
(Continued)

*Primary Examiner* — Mark A Laurenzi
*Assistant Examiner* — Shafiq Mian
(74) *Attorney, Agent, or Firm* — Muncy, Geissler, Olds & Lowe, P.C.

(57) ABSTRACT

A spraying heat preservation vapor supplying device comprises: a heat preservation boiler having an inner chamber, an outer chamber surrounding the inner chamber and a compartment layer separating the inner chamber from the outer chamber; a high heat capacity material filled in the outer chamber; a heater connected to the heat preservation boiler and heating the high heat capacity material, heat of the high heat capacity material being transferred to the inner chamber through the compartment layer; a supplier tube having a first end disposed in the inner chamber; a liquid source connected to a second end of the supplier tube and supplying a liquid to the inner chamber through the supplier tube to absorb heat of the inner chamber so that a vapor is generated; and a vapor outlet connected to the inner chamber and outputting the vapor. A generator apparatus using the vapor supplying device is also provided.

12 Claims, 4 Drawing Sheets

(51) Int. Cl.
*F28D 20/00* (2006.01)
*H02S 10/10* (2014.01)
*F22B 3/00* (2006.01)
*F22B 33/00* (2006.01)
*F01K 3/18* (2006.01)
*F22B 1/28* (2006.01)
*F22B 27/16* (2006.01)

(52) U.S. Cl.
CPC ............... *F22B 3/00* (2013.01); *F22B 27/16* (2013.01); *F22B 33/00* (2013.01); *F28D 20/00* (2013.01); *H02S 10/10* (2014.12); *F28D 2020/0047* (2013.01); *F28D 2020/0069* (2013.01); *F28D 2020/0086* (2013.01); *Y02E 60/142* (2013.01); *Y02E 70/30* (2013.01)

(56) References Cited

U.S. PATENT DOCUMENTS

| | | | | |
|---|---|---|---|---|
| 4,466,478 | A * | 8/1984 | Carlsson | C09K 5/063 165/10 |
| 4,696,338 | A * | 9/1987 | Jensen | F28D 20/025 165/10 |
| 5,103,803 | A * | 4/1992 | Epifanidis | F24F 5/0046 126/609 |
| 5,176,109 | A * | 1/1993 | Engstrom | F22B 31/0084 122/235.31 |
| 5,507,142 | A * | 4/1996 | Wintonyk | F02G 3/02 60/39.63 |
| 6,116,330 | A * | 9/2000 | Salyer | F28D 20/023 165/10 |
| 8,464,535 | B2 * | 6/2013 | White | F01K 3/08 60/659 |
| 2006/0213196 | A1 * | 9/2006 | Sukioka | F02G 1/055 60/651 |
| 2008/0276616 | A1 | 11/2008 | Flynn et al. | |
| 2008/0289793 | A1 * | 11/2008 | Geiken | F28D 20/00 165/10 |
| 2011/0000444 | A1 * | 1/2011 | Min | F24D 3/1008 122/14.1 |
| 2011/0061410 | A1 * | 3/2011 | Narayanamurthy | F24F 5/0017 62/115 |
| 2014/0000583 | A1 * | 1/2014 | Kotze | F01K 3/12 126/618 |
| 2015/0369542 | A1 * | 12/2015 | Minvielle | B23P 15/26 165/10 |

FOREIGN PATENT DOCUMENTS

| | | |
|---|---|---|
| CN | 203116328 U | 8/2013 |
| CN | 102135270 B | 10/2013 |
| CN | 103363690 A | 10/2013 |
| CN | 103485989 A | 1/2014 |
| CN | 203963892 U | 11/2014 |
| CN | 204225937 U | 3/2015 |
| CN | 204756858 U | 11/2015 |
| DE | 1281657 B | 10/1968 |
| DE | 2117103 A1 | 10/1972 |
| DE | 2145097 A1 | 3/1973 |
| EP | 2369288 A1 | 9/2011 |
| GB | 1164195 A | 9/1969 |
| JP | 1997126403 A | 11/1998 |
| JP | 2006112746 A | 4/2006 |
| JP | 2009052879 A | 3/2009 |
| JP | 2016125747 A | 7/2016 |
| KR | 20120058041 A | 6/2012 |
| WO | WO 7901005 A1 | 11/1979 |

OTHER PUBLICATIONS

Suyi Huang et al.,, "Heat storage of solar thermal power generation" China Electric Power Press, Aug. 2012, pp. 423-426.

* cited by examiner

SPRAYING HEAT PRESERVATION VAPOR SUPPLYING DEVICE AND GENERATOR APPARATUS USING SUCH DEVICE

This application claims priority of No. 104112278 filed in Taiwan R.O.C. on Apr. 16, 2015 under 35 USC 119, the entire content of which is hereby incorporated by reference.

BACKGROUND OF THE INVENTION

Field of the Invention

The invention relates to a vapor supplying device and a generator apparatus using the vapor supplying device, and more particularly to a spraying heat preservation vapor supplying device and a generator apparatus using the vapor supplying device.

Description of the Related Art

The solar power generating technology can save the energy and reduce the carbon by using solar cells to convert the optical energy into the electrical energy. However, the solar power generating is restricted to the sunshine duration and does not work at night. Due to the flourishing development of the solar cell, there are more and more solar generator apparatuses installed in each area, the considerable electrical power can be provided to the mains supply system in the daytime. Thus, the solar generator apparatus may generate the excess electrical power in the future daytime. Although batteries can be used to store the electrical energy, the batteries have the high price and the low efficiency and cause the environment contamination.

In addition, water in the conventional boiler is heated by fire to generate the water vapor to drive the vapor generator to generate the power. However, the danger of boiler explosion tends to occur when the boiler is not well monitored.

Thus, how to provide secure and stable energy storage and conversion ways is a problem to be solved by this invention.

SUMMARY OF THE INVENTION

It is therefore an object of the invention to provide a spraying heat preservation vapor supplying device and a generator apparatus using the vapor supplying device. The energy is stored and converted using a safe and stable energy storage way to effectively manage the energy.

To achieve the above-mentioned object, the invention provides a spraying heat preservation vapor supplying device, comprising: a heat preservation boiler having an inner chamber, an outer chamber surrounding the inner chamber, and a compartment layer separating the inner chamber from the outer chamber; a high heat capacity material filled in the outer chamber; a heater connected to the heat preservation boiler and heating the high heat capacity material, wherein heat of the high heat capacity material is transferred to the inner chamber through the compartment layer; a supplier tube having a first end disposed in the inner chamber of the heat preservation boiler; a liquid source, which is connected to a second end of the supplier tube, and supplies a liquid to the inner chamber through the supplier tube, so that the liquid absorbs heat of the inner chamber to generate a vapor; and a vapor outlet connected to the inner chamber, wherein the vapor is outputted through the vapor outlet.

With the vapor supplying device, when the pressure of the inner chamber is too high, the water in the supplier tube cannot be sprayed into the inner chamber so that the effect of automatically cutting off the liquid source is obtained. As long as the liquid does not enter the inner chamber and expand, there is no danger of explosion. Thus, the heat preservation boiler is quite safe.

The invention also provides a generator apparatus comprising: a solar power generating device for converting a solar energy into an electrical energy; the spraying heat preservation vapor supplying device, wherein the heater converts the electrical energy into heat to heat the high heat capacity material; and a vapor generator connected to the vapor outlet and receiving the vapor to generate an electrical power.

With the generator apparatus, when the excess electrical power is generated by the solar power generating device under the sunshine, a control device controls the electrical power of the solar power generating device to be provided to the heater to heat the high heat capacity material. When the sunshine disappears, the control device controls the liquid source to provide the liquid to the inner chamber to generate the vapor, and the vapor generator generates the electrical power using the vapor so that the optimum management of the electrical power can be performed.

The above and other aspects of the invention will become better understood with regard to the following detailed description of the preferred but non-limiting embodiments. The following description is made with reference to the accompanying drawings.

DETAILED DESCRIPTION OF THE INVENTION

The present invention will be apparent from the following detailed description, which proceeds with reference to the accompanying drawings.

Figure 1:
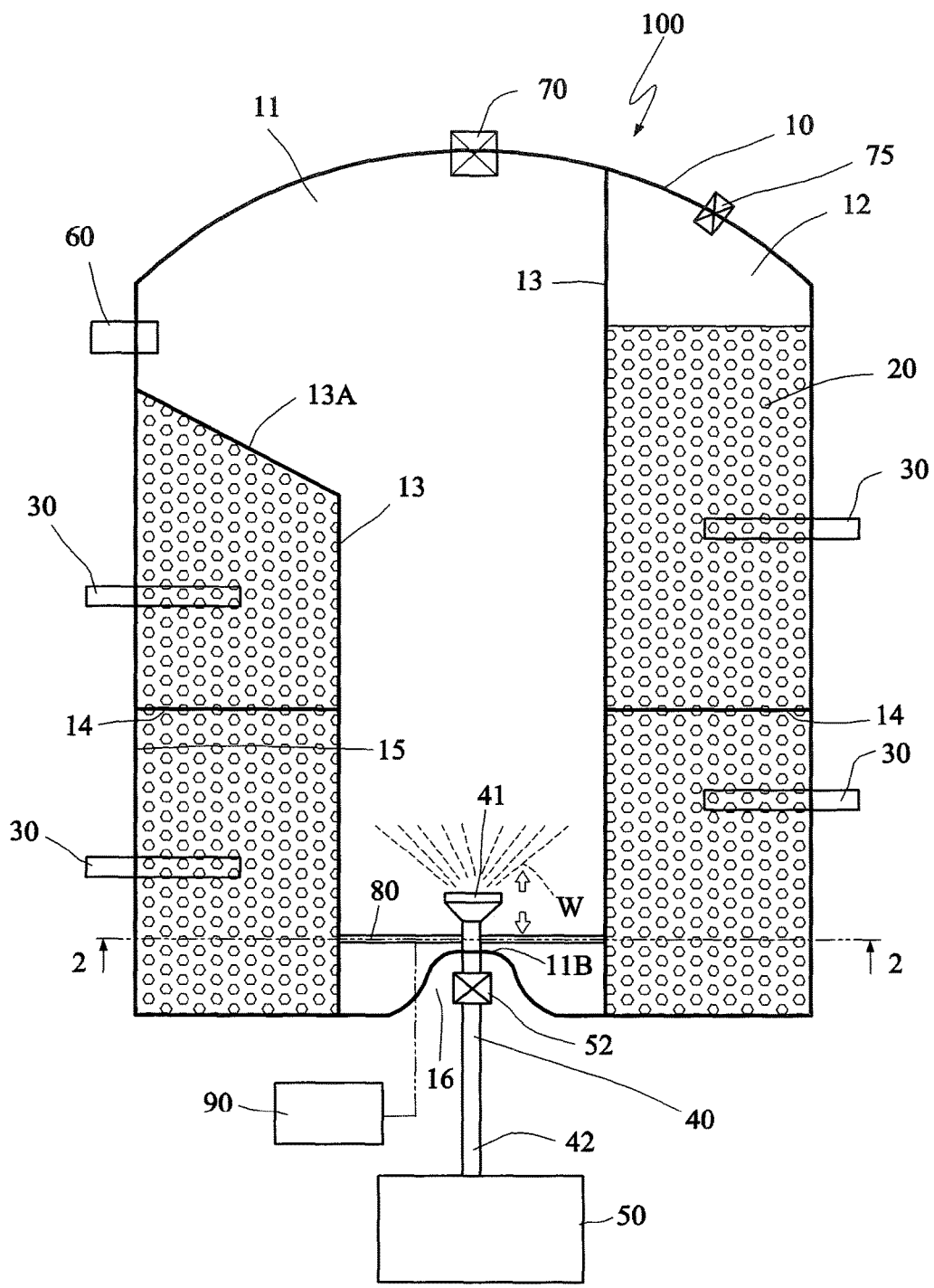
FIG. 1 is a schematic view showing a spraying heat preservation vapor supplying device according to a first embodiment of the invention.
Figure 2:
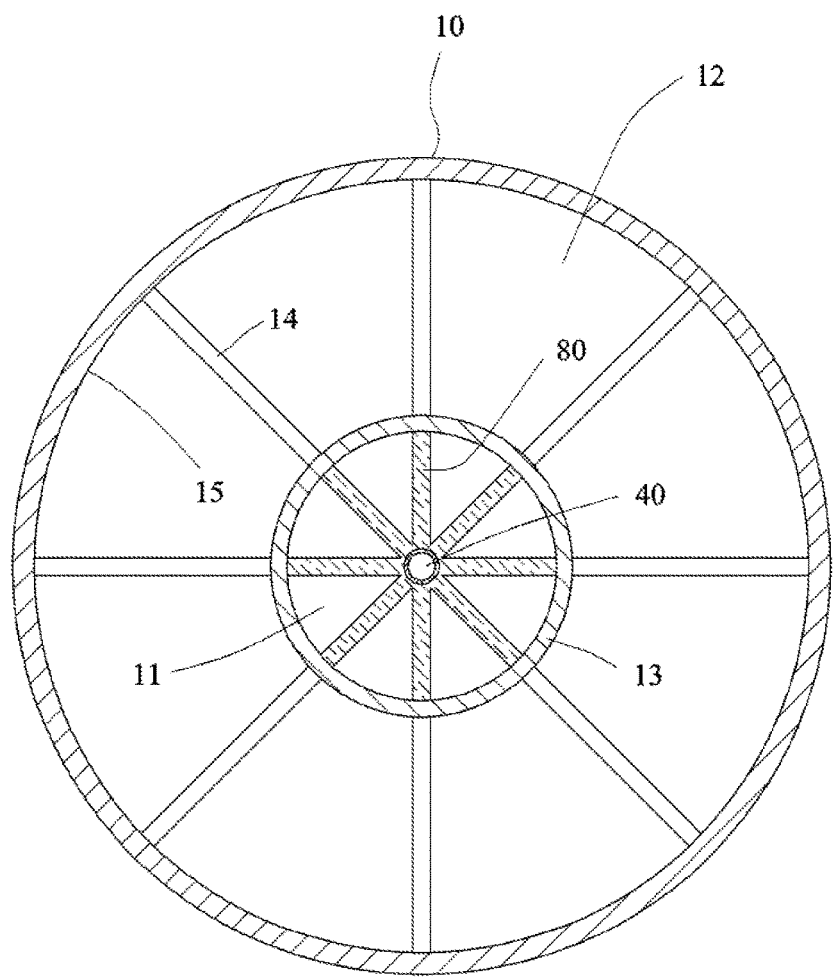
FIG. 2 is a cross-sectional view taken along a line 2-2 of FIG. 1.

FIG. 1 is a schematic view showing a spraying heat preservation vapor supplying device according to a first embodiment of the invention. FIG. 2 is a cross-sectional view taken along a line 2-2 of FIG. 1. Referring to FIGS. 1 and 2, the spraying heat preservation vapor supplying device 100 of this embodiment comprises a heat preservation boiler 10, a high heat capacity material 20, a heater 30, a supplier tube 40, a liquid source 50 and a vapor outlet 60.

The heat preservation boiler 10 has an inner chamber 11, an outer chamber 12 surrounding the inner chamber 11 and a compartment layer 13 separating the inner chamber 11 from the outer chamber 12. The heat preservation boiler 10 is preferably made of a heat insulating material to decrease the heat dissipated from the heat preservation boiler 10 to the external environment. The heat insulating material can block the heat transfer, and includes, for example but without limitation to, glass fiber, asbestos, rockwool, silicate, aerogel blanket, vacuum plate or the like.

The high heat capacity material 20 filled in the outer chamber 12 has the high heat capacity and the safe and stable state at the high temperature. In one example, the high heat capacity material 20 comprises nitrate, such as sodium nitrate, potassium nitrate, lithium nitrate or sodium nitrite. In another example, the high heat capacity material 20 is the multi-element mixed nitrate, such as the four-element mixed nitrate composed of sodium nitrate, potassium nitrate, lithium nitrate and sodium nitrite. When the mass ratio of $NaNO_3:KNO_3:LiNO_3:NaNO_2$ is equal to 0.23:0.407:0.106: 0.257, the four-element mixed salt has the melting point as low as 92° C., and the boiling point reaching 559.3° C. By adjusting the mass ratio and type (binary or ternary), different multi-element mixed nitrate materials having different melting points and boiling points can be fabricated to have the melting points ranging from 87 to 97° C. and the boiling points ranging from 540 to 580° C.

The heater 30 connected to the heat preservation boiler 10 heats the high heat capacity material 20. The heat of the high heat capacity material 20 is transferred to the inner chamber 11 through the compartment layer 13. In this embodiment, the heater 30 converts the electrical energy into the heat, and heats the high heat capacity material 20 into the liquid state at the temperature ranging from 450 to 580° C., more particularly from 500 to 600° C. In this embodiment, the high heat capacity material 20 is not completely filled into the outer chamber 12, so that a little space is left for the expansion of the liquid high heat capacity material 20. In one non-restrictive example, the heater 30 is a stainless steel electrical heater having a metal pipe serving as a housing, in which helical electro-thermo alloy silks, made of nickel chromium or iron chromium alloy, are uniformly distributed along a center axis, and gaps between the silks are filled with a magnesia sand with the good insulation and thermal conductivity, wherein two ends of the pipe are sealed by silica gel or ceramics. The stainless steel electrical heater has the high heating efficiency, can be conveniently used, can be simply installed, is free from the contamination, and is widely used in various heating occasions. The heater has the highest working temperature reaching 850° C., for example.

The supplier tube 40 has a first end 41 disposed in or inserted into the inner chamber 11 of the heat preservation boiler 10. Preferably, the first end 41 is present in the form of a nozzle to spray a mist or mist-like liquid (e.g., water or water mist) toward the compartment layer 13 to form the high-temperature vapor.

The liquid source 50 is connected to a second end 42 of the supplier tube 40, and supplies a liquid W in an upward direction to the inner chamber 11 through the supplier tube 40 penetrating through a bottom 11B of the inner chamber 11 so that the liquid W absorbs the heat from the inner chamber 11 and the vapor is generated. In this embodiment, the liquid W is water, which may be the pure water or have the property similar to the pure water, and can be recycled. The liquid source 50 is connected to the supplier tube 40 through a check valve 52. In another example, another liquid may be heated. The position of the check valve 52 is preferably close to the bottom of the inner chamber 11, and is disposed in a concave portion 16 of the bottom of the heat preservation boiler 10 in this embodiment. In one example, the supplier tube 40 is made of a metal material. In another example, the supplier tube 40 is made of a heat insulating material to prevent the water in the supplier tube 40 from dangerously vaporizing in the supplier tube 40.

The vapor is outputted from the vapor outlet 60, which is connected to the inner chamber 11 and disposed at a level higher than a level of the first end 41 of the supplier tube 40. The heat of the high heat capacity material 20 coming from the outer chamber 12 can be transferred to the water mist through the conduction of the air and the radiation of the compartment layer 13. The water mist can expand by about 1700, 2600 or even 3000 times in the high-temperature environment, and thus rapidly vaporize into the vapor. Because the pressure of the inner chamber 11 increases at this time, the vapor can be discharged from the vapor outlet 60. It is worth noting that the portion of the compartment layer 13 close to the vapor outlet 60 may be formed with an inclined surface 13A, so that the vapor is sprayed from the vapor outlet 60 through the nozzle-like structure formed by the inclined surface 13A and the inner camber of the heat preservation boiler 10.

In addition, the vapor supplying device 100 may further comprise a safety valve 70, a holder 80, a moving mechanism 90 and a safety venthole or safety vent valve 75. Of course, these elements may be properly omitted. The safety valve 70 is disposed on the heat preservation boiler 10 and communicates with the inner chamber 11 and the external environment to perform a discharge operation to the external environment to lower the pressure of the inner chamber 11 when the pressure of the inner chamber 11 is higher than a first predetermined pressure. In another example, the safety valve 70 may further perform an intake operation from the external environment to increase the pressure of the inner chamber 11 when the pressure of the inner chamber 11 is lower than a second predetermined pressure. The safety venthole or safety vent valve 75 is disposed on the heat preservation boiler 10, and communicates the outer chamber 12 with the external environment to perform the safe discharge operation and keep the safety in the outer chamber 12. The holder 80 is disposed in the inner chamber 11 and holds the supplier tube 40 in the inner chamber 11 to prevent the supplier tube 40 from running randomly due to the disturbance of the vapor. The moving mechanism 90 connected to the holder 80 moves the holder 80 to change a distance from the bottom 11B of the inner chamber 11 to the first end 41 of the supplier tube 40, and thus the outlet position of the supplier tube 40, so that the worker can make the optimum position adjustment.

In this embodiment, the heat preservation boiler 10 further comprises frames 14 for fixing the compartment layer 13 to an inner wall 15 of the heat preservation boiler 10 and providing a stable support. In another embodiment, the heat preservation boiler 10 has no frame and is directly fixed to the compartment layer 13 of the heat preservation boiler 10 to achieve the effect of stably separating the inner chamber 11 from the outer chamber 12.

In the embodiment of the invention, when the pressure of the inner chamber is too high, the water in the supplier tube cannot be sprayed into the inner chamber so that the effect of automatically cutting off the liquid source is obtained. As long as the liquid does not enter the inner chamber and expand, there is no danger of explosion. Thus, the heat preservation boiler is quite safe.

Figure 3:
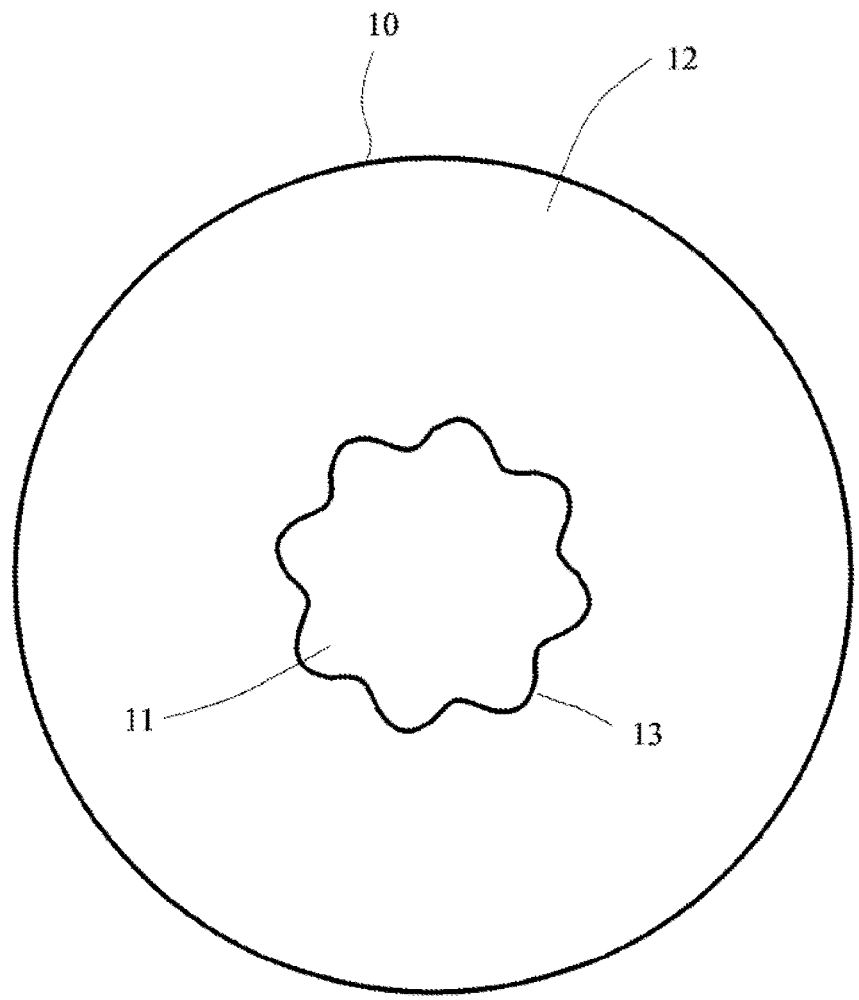
FIG. 3 is a schematically simplified view showing a spraying heat preservation vapor supplying device according to a second embodiment of the invention.

FIG. 3 is a schematically simplified view showing a spraying heat preservation vapor supplying device according to a second embodiment of the invention. As shown in FIG. 3, this embodiment is similar to the first embodiment except that the compartment layer 13 has the crepe-like shape to enlarge the interface area between the outer chamber 12 and the inner chamber 11.

Figure 4:
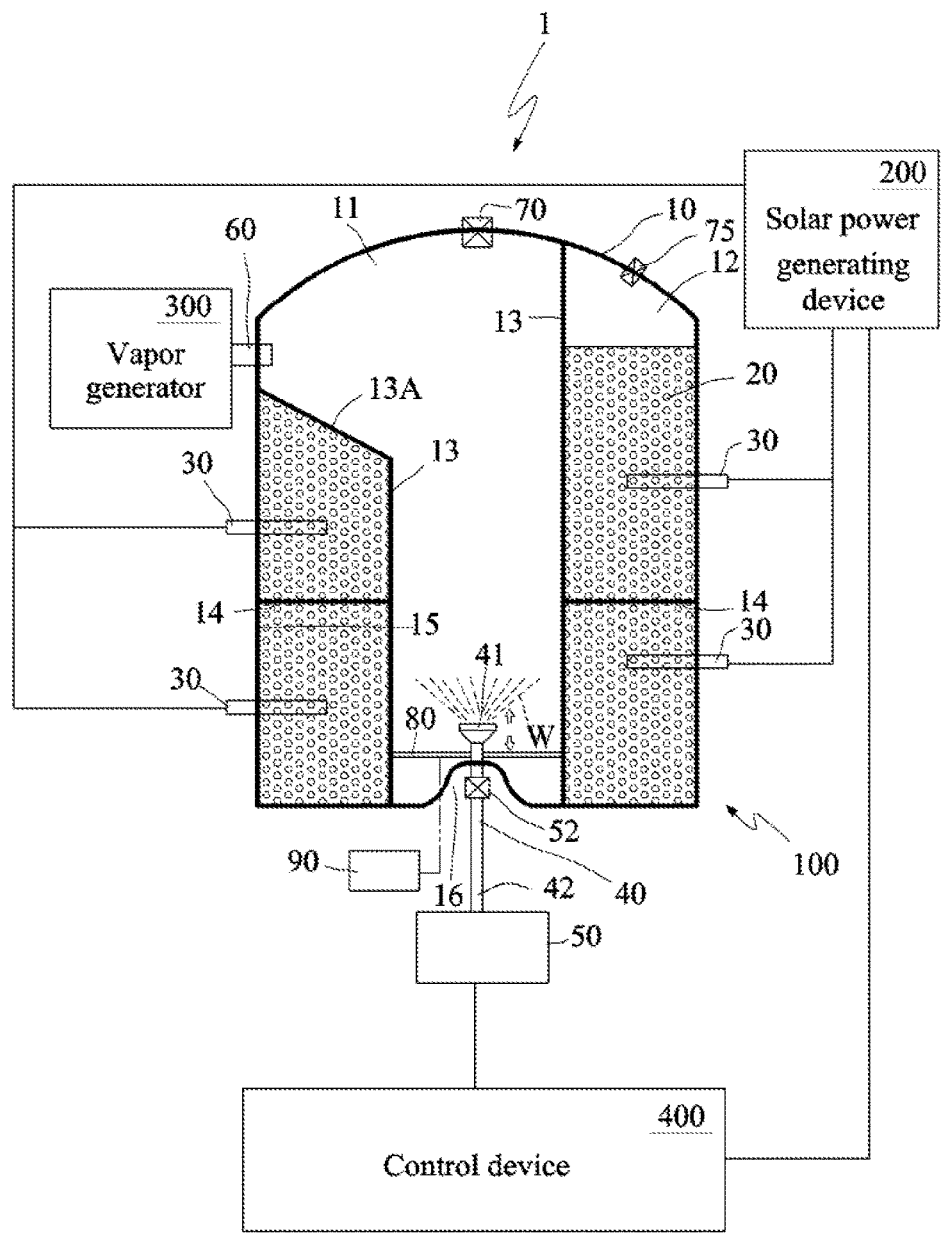
FIG. 4 is a schematic view showing a generator apparatus according to the first embodiment of the invention.

FIG. 4 is a schematic view showing a generator apparatus 1 according to the first embodiment of the invention. Referring to FIG. 4, the generator apparatus 1 of this embodiment comprises a solar power generating device 200, the vapor supplying device 100 and a vapor generator 300. The solar power generating device 200 converts the solar energy into the electrical energy. The heater 30 converts the electrical energy of the solar power generating device 200 into the heat to heat the high heat capacity material 20. The vapor generator 300 connected to the vapor outlet 60 receives the vapor to generate the electrical power. In addition, the generator apparatus 1 further comprises a control device 400 electrically connected to the solar power generating device 200, the vapor supplying device 100 and the vapor generator 300. The control device 400 controls the vapor supplying device 100 to supply the vapor to the vapor generator 300 to generate the electrical power when the solar power generating device 200 stops generating the electrical energy. The water or low-temperature water vapor generated after the electrical power is generated can be further introduced into the liquid source 50 and recycled. In another embodiment, the gas or vapor discharged from the safety valve 70 and the safety venthole or safety vent valve 75 can be inputted into the liquid source 50 to pre-heat the liquid therein to reduce the heat loss.

With the above-mentioned embodiment, when the excess electrical power is generated by the solar power generating device under the sunshine, the control device controls the electrical power of the solar power generating device to be provided to the heater to heat the high heat capacity material. When the sunshine disappears, the control device controls the liquid source to provide the liquid to the inner chamber 11 to generate the vapor, and the vapor generator generates the electrical power using the vapor so that the optimum management of the electrical power can be performed.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A spraying heat preservation vapor supplying device, comprising:
  a heat preservation boiler having an inner chamber, an outer chamber surrounding the inner chamber and a compartment layer separating the inner chamber from the outer chamber;
  a high heat capacity material filled in the outer chamber;
  a heater, which is connected to the heat preservation boiler and heats the high heat capacity material, wherein heat of the high heat capacity material is transferred to the inner chamber through the compartment layer;
  a supplier tube having a first end disposed in the inner chamber of the heat preservation boiler;
  a liquid source, which is connected to a second end of the supplier tube, and supplies a liquid to the inner chamber through the supplier tube, so that the liquid absorbs heat of the inner chamber to generate a vapor; and
  a vapor outlet connected to the inner chamber, wherein the vapor is outputted through the vapor outlet,
  wherein a portion of the compartment layer close to the vapor outlet is formed with an inclined surface, so that the vapor is sprayed from the vapor outlet through a nozzle-like structure formed by the inclined surface and an inner camber of the heat preservation boiler.

2. The spraying heat preservation vapor supplying device according to claim 1, further comprising:
  a safety valve disposed on the heat preservation boiler and communicating the inner chamber with an external environment to perform a discharge operation to the external environment when a pressure of the inner chamber is higher than a first predetermined pressure.

3. The spraying heat preservation vapor supplying device according to claim 2, wherein the safety valve further performs an intake operation from the external environment when the pressure of the inner chamber is lower than a second predetermined pressure.

4. The spraying heat preservation vapor supplying device according to claim 1, further comprising:
  a holder disposed in the inner chamber and supporting the supplier tube in the inner chamber.

5. The spraying heat preservation vapor supplying device according to claim 4, further comprising:
  a moving mechanism, which is connected to the holder and for moving the holder.

6. The spraying heat preservation vapor supplying device according to claim 1, wherein the high heat capacity material comprises nitrate or multi-element mixed nitrate.

7. The spraying heat preservation vapor supplying device according to claim 1, wherein the high heat capacity material is heated to become a liquid at a temperature ranging from 450 to 580° C.

8. The spraying heat preservation vapor supplying device according to claim 1, wherein the heat preservation boiler further comprises multiple frames fixing the compartment layer to an inner wall of the heat preservation boiler.

9. A generator apparatus, comprising:
  a solar power generating device converting a solar energy into an electrical energy;
  the spraying heat preservation vapor supplying device according to claim 1, wherein the heater converts the electrical energy into heat to heat the high heat capacity material; and
  a vapor generator, which is connected to the vapor outlet and receives the vapor to generate an electrical power.

10. The generator apparatus according to claim 9, further comprising:
  a control device electrically connected to the solar power generating device, the spraying heat preservation vapor supplying device and the vapor generator, wherein the control device controls the spraying heat preservation vapor supplying device to provide the vapor to the vapor generator to generate the electrical power when the solar power generating device stops generating the electrical energy.

11. The spraying heat preservation vapor supplying device according to claim 1, wherein the liquid source supplies the liquid in an upward direction to the inner chamber, and the vapor outlet is disposed at a level higher than a level of the first end of the supplier tube.

12. The spraying heat preservation vapor supplying device according to claim 1, wherein the heater heats the high heat capacity material into a liquid state, and the high heat capacity material is not completely filled into the outer chamber, so that a space for expansion of the liquid high heat capacity material is left in the outer chamber.

* * * * *